United States Patent
Kirsch et al.

(10) Patent No.: US 8,811,900 B2
(45) Date of Patent: Aug. 19, 2014

(54) SYSTEM AND METHOD FOR HANDS FREE CONNECT APPLICATION FOR THE AUTOMOBILE ENVIRONMENT

(75) Inventors: David Michael Kirsch, Torrance, CA (US); Eric Shigeru Ohki, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 12/945,380

(22) Filed: Nov. 12, 2010

(65) Prior Publication Data
US 2011/0117845 A1    May 19, 2011

Related U.S. Application Data (60) Provisional application No. 61/261,205, filed on Nov. 13, 2009.

(51) Int. Cl.
| | |
|---|---|
| *H04B 7/00* | (2006.01) |
| *H04M 1/60* | (2006.01) |
| *H04W 12/06* | (2009.01) |
| *H04W 8/00* | (2009.01) |

(52) U.S. Cl.
CPC ............ *H04M 1/6091* (2013.01); *H04W 12/06* (2013.01); *H04W 8/005* (2013.01)
USPC ..................... 455/41.2; 455/569.2; 455/575.9; 340/5.61; 340/426.16

(58) Field of Classification Search
USPC ......... 455/41.1, 41.2, 569.2, 575.9; 340/5.61, 340/426.16
See application file for complete search history.

(56) References Cited

U.S. PATENT DOCUMENTS

| | | | |
|---|---|---|---|
| 6,687,517 B2 | 2/2004 | Kinnunen | |
| 6,915,126 B2 | 7/2005 | Mazzara | |
| 7,079,015 B2 | 7/2006 | Gibeau | |
| 7,437,183 B2 * | 10/2008 | Makinen | .................... 455/569.1 |
| 2004/0252838 A1 | 12/2004 | Ma | |
| 2006/0154698 A1 | 7/2006 | Ogura et al. | |
| 2006/0270466 A1 | 11/2006 | Liu | |
| 2007/0037517 A1 * | 2/2007 | Camuffo et al. | .............. 455/41.2 |
| 2007/0259674 A1 | 11/2007 | Neef et al. | |
| 2008/0039018 A1 | 2/2008 | Kim | |
| 2008/0287064 A1 | 11/2008 | Weiss | |
| 2008/0305787 A1 | 12/2008 | Yamada et al. | |
| 2009/0061769 A1 | 3/2009 | Zimbric et al. | |
| 2009/0160607 A1 * | 6/2009 | Edwards et al. | ............. 340/5.61 |

OTHER PUBLICATIONS

Bluetooth Sig, Inc., "Simple Pairing Whitepaper," Aug. 3, 2006, twenty-three pages. [Online] [Retrieved Jan. 10, 2012] Retrieved from the Internet <URL:http://mclean-linsky.net/joel/cv/Simple%20Pairing_WP_V10r00.pdf.>.

* cited by examiner

*Primary Examiner* — Tuan H Nguyen
(74) *Attorney, Agent, or Firm* — Fenwick & West LLP (57) ABSTRACT

A module executed on a mobile communications device (MCD) to automatically pair the MCD with a vehicle. The module determines whether the MCD's short range communication technology, e.g., Bluetooth® technology is enabled. If not, the module turns on the MCD's short range communication technology. The module also determines whether the MCD is in a discovery mode, which is the mode of the MCD that enables the MCD to pair. If not, the module turns on the MCD's discovery mode. The module then automatically pairs the MCD and the vehicle. In an embodiment the automatic pairing includes setting the vehicle's hands free telephone module to a discovery mode, if the short range communications from the MCD and HFT are being seen by each other than a personal identification number (PIN) is obtained. In an embodiment the PIN is not entered by a user of the MCD or vehicle, but is automatically determined. The MCD and HFT are then securely paired using conventional pairing techniques.

21 Claims, 5 Drawing Sheets

SYSTEM AND METHOD FOR HANDS FREE CONNECT APPLICATION FOR THE AUTOMOBILE ENVIRONMENT

RELATED APPLICATIONS

This application claims priority from U.S. provisional application No. 61/261,205 titled "Hands Free Connection Application for an Automobile Environment" filed on Nov. 13, 2009 which is incorporated by reference herein in its entirety.

FIELD OF THE INVENTION

This application relates to automobiles and more particularly to vehicle pairing with communication devices.

BACKGROUND

Current Bluetooth® pairing technologies for the automotive environment consist of a variety of methods that exchange a personal identification number (PIN) to confirm correct pairing between an automobile and a communication device. Conventional Bluetooth® systems are implemented to make the user manually put the desired cellular phone in a Bluetooth® discovery mode and enter a user-generated PIN number in the vehicle system. The vehicle then sends this PIN to Bluetooth® devices in the vicinity that have their discovery mode activated. The activated devices in discovery mode receive the vehicle's request and prompt their user to enter a PIN. Once entered correctly, the system validates and internal Bluetooth® addresses and settings can be exchanged. Conventional systems for Bluetooth® pairing between the phone and the vehicle systems use similar methods. In some instances, the PIN can be automatically generated by the phone or the vehicle and entered in the other's prompt.

Conventional systems and methods require that the user entering a PIN into a device to validate the pairing intention. This action can be confusing and difficult in many situations. In addition, conventional systems and methods require the user to put their phone device in the discovery mode (or similar mode). Although the effort between devices differs, this process is often confusing and difficult to achieve within a reasonable amount of effort and time in particular to users uncomfortable with cell phone technology.

SUMMARY

A module executed on a mobile communications device (MCD) to automatically pair the MCD with a vehicle. The module determines whether the MCD's short range communication technology, e.g., Bluetooth® technology is enabled. If not, the module turns on the MCD's short range communication technology. The module also determines whether the MCD is in a discovery mode, which is the mode of the MCD that enables the MCD to pair. If not, the module turns on the MCD's discovery mode. The module then automatically pairs the MCD and the vehicle. In an embodiment the automatic pairing includes setting the vehicle's hands free telephone module to a discovery mode, if the short range communications from the MCD and HFT are being seen by each other than a personal identification number (PIN) is obtained. In an embodiment the PIN is not entered by a user of the MCD or vehicle, but is automatically determined. The MCD and HFT are then securely paired using conventional pairing techniques.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments are now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. The memory/storage can be transitory or non-transitory. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the embodiments are not described with reference to any particular programming language. It will be appreciated that a variety of programming languages may be used to implement the teachings of the embodiments as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments are intended to be illustrative, but not limiting, of the scope of the embodiments, which are set forth in the claims.

Figure 1:
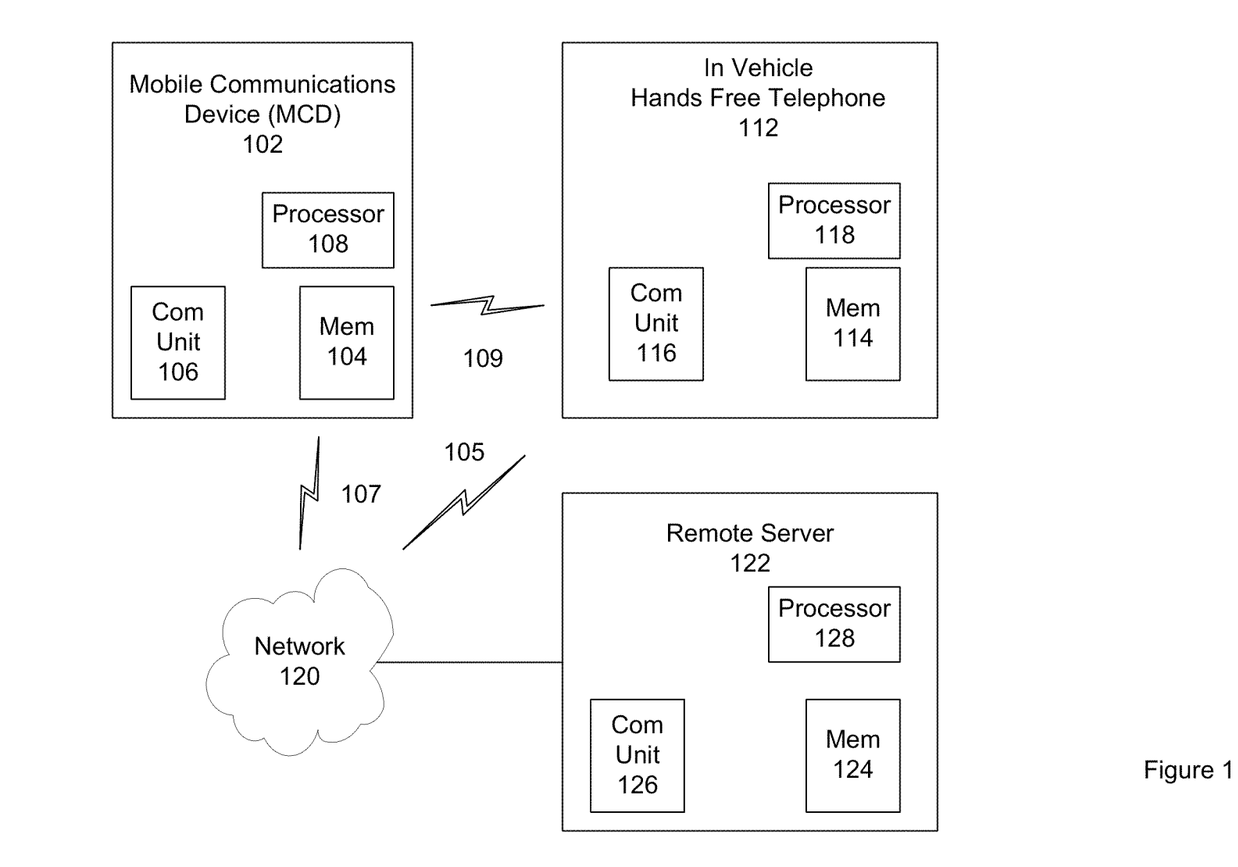
FIG. 1 is an illustration of an environment in which one embodiment may operate.

FIG. 1 illustrates an exemplary operating environment 100 for various embodiments. Operating environment 100 may include an in-vehicle hands free telephone (HFT) system 112, a wireless mobile communication device (MCD) 102, a communication link 105 for communications between the in-vehicle system 112 and the network 120, a short-range communication link 109 for communication between the in-vehicle system 112 and wireless mobile communication device 102, a wireless networking communication link 107 between wireless mobile communication device 102 and a network 120, and a processing device, such as a server 122 connected to network 120. The communication links described herein can directly or indirectly connect these devices. The network 120 can be a wireless communication network such as a cellular network comprised of multiple base stations, controllers, and a core network that typically includes multiple switching entities and gateways.

In-vehicle system 112 and wireless mobile communication device 102 may communicate with each other via a short-range communication link 109 which uses short-range communication technology, such as, for example, Bluetooth® technology or other short-range communication technology, for example, Universal Serial Bus (USB). In-vehicle system 112 and wireless mobile communication device 102 may connect, or pair, with each other via short-range communication link 109. In an embodiment the in vehicle system 112 can includes a communications unit 116 to assist in the short range communications, a memory unit device 114, and a processor 118. The in-vehicle hands free telephone (HFT) system 112 can be part of a vehicle's telematics system which includes memory/storage, processor(s) and communication unit(s). FIG. 1 shows the memory 114, communication unit 116 and processor 118 as being part of the in vehicle HFT system 112 for ease of discussion. In alternate embodiments the HFT system 112 can utilize the vehicle's telematics unit to assist in performing various functions. For example the communications unit 116 and/or processor 118, for example, can be part of the vehicle's telematics unit or can be a separate unit in the vehicle. The MCD 102 has an operating system and can include various applications either integrated into the operating system or stored in memory/storage 104 and executed by the processor 108.

Processors 108, 118 and/or 128 process data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processors can comprises an arithmetic logic unit, a microprocessor, a general purpose computer, or some other information appliance equipped to transmit, receive and process electronic data signals from the memory 104, 114, 124, and other devices both shown and not shown in the figures.

Examples of a wireless mobile communication device (MCD) 102 include a cellular phone, personal device assistant (PDA), smart phone, pocket personal computer (PC), laptop computer, smart watch or other devices having a processor, communications application could be part of a larger suite of vehicle features and interactions. Examples of applications include applications available for the iPhone™ that is commercially available from Apple Computer, Cupertino, Calif. applications for phones running the Android™ operating system that is commercially available from Google, Inc., Mountain View, Calif., applications for BlackBerry devices, available from RIM, Ontario Canada or applications available for Windows Mobile devices, available from Microsoft Corp., Redmond, Wash. In an embodiment the MCD 102 includes a communications unit 106 a memory unit device 104, and a processor 108. The MCD 102 has an operating system and can include various applications either integrated into the operating system or stored in memory/storage 104 and executed by the processor 108.

In alternate embodiments a mobile communication device 102 can be used in conjunction with a communication device embedded in the vehicle is used, such as a vehicle embedded phone, a wireless network card or other device (e.g., a Wi-Fi capable device). For ease of discussion the description herein describes the operation of the embodiments with respect to an embodiment using a mobile communication device 102. However, this is not intended to limit the scope of the embodiments and it is envisioned that other embodiments operate using other communication systems between the in-vehicle system 112 and the network 120, as described above.

In-vehicle system 112 may send information to wireless mobile communication device 102. Wireless mobile communication device 102 may send information to in-vehicle system 112 via short-range communication link 109. Wireless mobile communication device 102 may store information received from in-vehicle system 112, and/or may provide the information to a remote processing device, such as, for example, server 122, via network 120. Remote server 122 can include a communications unit 126 to connect to the network 120, for example a memory/storage unit 124 and a processor 128.

In some embodiments, in-vehicle system 112 may provide information to the wireless mobile communication device 102. Wireless mobile communication device 102 may use that information to obtain additional information from network 120 and/or server 122. The additional information may also be obtained in response to providing information with respect to a prompt on wireless mobile communication device 102 from in-vehicle system 112.

Network 120 may include a wireless communication network, for example, a cellular telephony network, as well as one or more other networks, such as, the Internet, a public-switched telephone network (PSTN), a packet-switching network, a frame-relay network, a fiber-optic network, and/or other types of networks.

Figure 2:
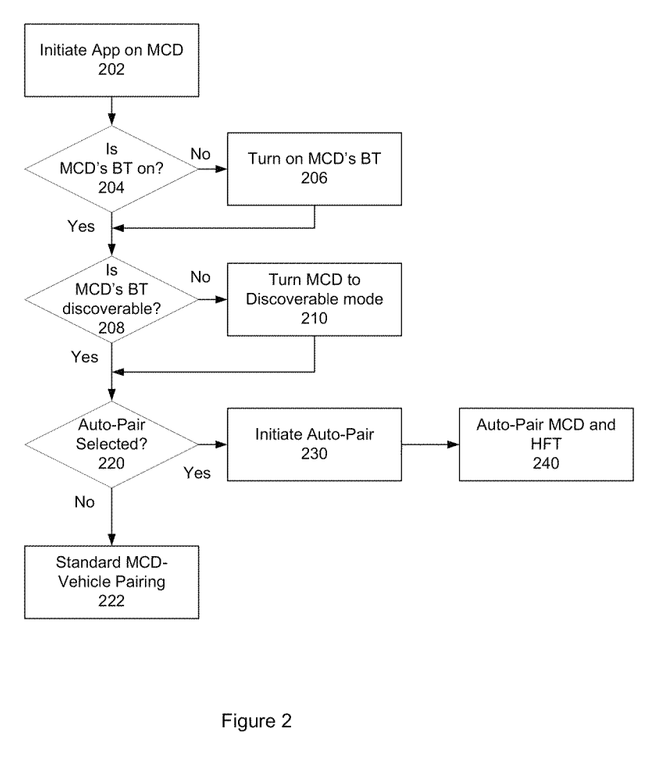
FIG. 2 is a flowchart of a method in accordance with one embodiment.

FIG. 2 is a flowchart of a method in accordance with one embodiment. In an embodiment a software module is executed on the MCD 102. The software module can be an application, such as an iPhone™ or Android™-based application. The application can be stored on the MCD 102 and can be part of the embedded software of the MCD 102 (e.g., phone) or integrated into the MCD's 102 operating system. Alternatively, the application can be downloaded via a wired or wireless system, e.g., using Apple's iTunes™. In addition, in an embodiment the software module can be part of any of a variety of software paradigms, e.g., software as a service (SaaS), cloud computing. For ease of discussion, the following description will be based on the model of the software module being an application that is stored in the MCD memory module 104 and executed by the MCD processor 108. The software module will be referred to as a Honda application (app).

As described above, in order to pair an MCD 102 and HFT 112 both need to be transmitting/receiving wireless communication signals using a protocol, e.g., a Bluetooth protocol, and be in discovery mode. In addition, current systems require the user to enter a PIN into a MCD 102 and/or HFT 112 in order to validate the pairing intention. This action can be confusing and difficult in many situations. For example, for some MCD 102 users, placing the phone in Bluetooth® mode and then into discovery mode is confusing and presents a barrier for use. One reason for this is the technique for putting the MCD 102 in these modes differs among MCDs 102 which makes the process confusing and difficult to achieve within a reasonable amount of effort and time.

An embodiment is a software module, hereafter referred to as a Honda application, executed on an MCD 102 to automatically pair the MCD 102 with a vehicle. The Honda application determines 204 whether the MCD's 102 short range communication technology, e.g., Bluetooth® technology, is enabled. The Honda application can access the status of the MCD 102 in order to make this determination using conventional techniques.

If the short range communication technology is not on, the Honda application turns on 206 the MCD's 102 short range communication technology by, for example, providing instructions to the communications unit 106 of the MCD 102. This is accomplished automatically, without user intervention once the selection is made in the Honda application. The Honda application also automatically, without user intervention, determines 208 whether the MCD 102 is in a discovery mode, which is the mode of the MCD 102 that enables the MCD 102 to pair with another device, e.g., the vehicle. The Honda application can access the status of the MCD 102 in order to make this determination. If the MCD is not in discovery mode, the Honda application automatically, without user intervention, turns on 210 the MCD's 102 discovery mode by, for example, providing instructions to the communications unit 106 of the MCD 102. In an embodiment the Honda application determines 220 whether automatic pairing is selected. Automatic pairing can be selected by a user of the Honda application on the MCD 102 or it can be selected by a user of a vehicle, for example, by selecting a button/icon in the vehicle. If automatic pairing is selected then the automatic pairing process is initiated 230 and the Honda application automatically pairs 240 the MCD 102 and the vehicle. If the automatic pairing is not selected then the MCD 102 and vehicle can pair 222 using conventional paring techniques.

The automatic pairing process can be initiated based upon the occurrence of a triggering event. A triggering event can be a single event, a plurality of events or a plurality of events that occur in a particular order, for example. Examples of triggering events may include: pressing a button in the vehicle or MCD 102, switching the vehicle ignition on, switching the vehicle ignition switch off, the location of the vehicle, opening or closing a door, removing the key from the ignition, a voice command to the vehicle, unlocking the vehicle using a keyless entry system, engaging the vehicle in another way, e.g., pulling a door handle, as well as other events or combination of events. As noted above, the location of the vehicle can be a trigger and the location can be based upon information determined by a navigation system, which may include a GPS system or other location determination system, located in the vehicle, for example.

In an embodiment, instructions to initiate the automatic pairing process 230 can be displayed on the MCD 102. The Honda application can be configured to a particular vehicle (either automatically detecting the type of vehicle or the user can enter the vehicle make, model or other identifier, for example) and the process for initiating that vehicle can be displayed on the MCD 102. For example, the Honda application can display the steps required to pair the vehicle. When the Honda application starts it can instruct the user to select "Start Pairing Setup" or the like, which can be selected on the MCD 102. This sets up the phone to be ready for pairing, e.g., by turning on the MCDs 102 short range communication functionality 206 and putting the phone in Discovery mode 208, as described above. The above process can also be started automatically on the application's first startup. On additional startups, if a previously paired vehicle is not detected, the system can proceed to the pairing setup procedure. The Honda application can also display the next steps on the MCD 102. One example of what can be displayed using text and/or graphics on the phone is: (1) Proceed to your car, (2) Start your car, (3) Simultaneously Press the Phone button and the Cancel button on the steering wheel, and (4) system will beep when pairing is complete. This is just an example, alternate steps can be displayed without departing from the scope of the embodiments.

Figure 3:
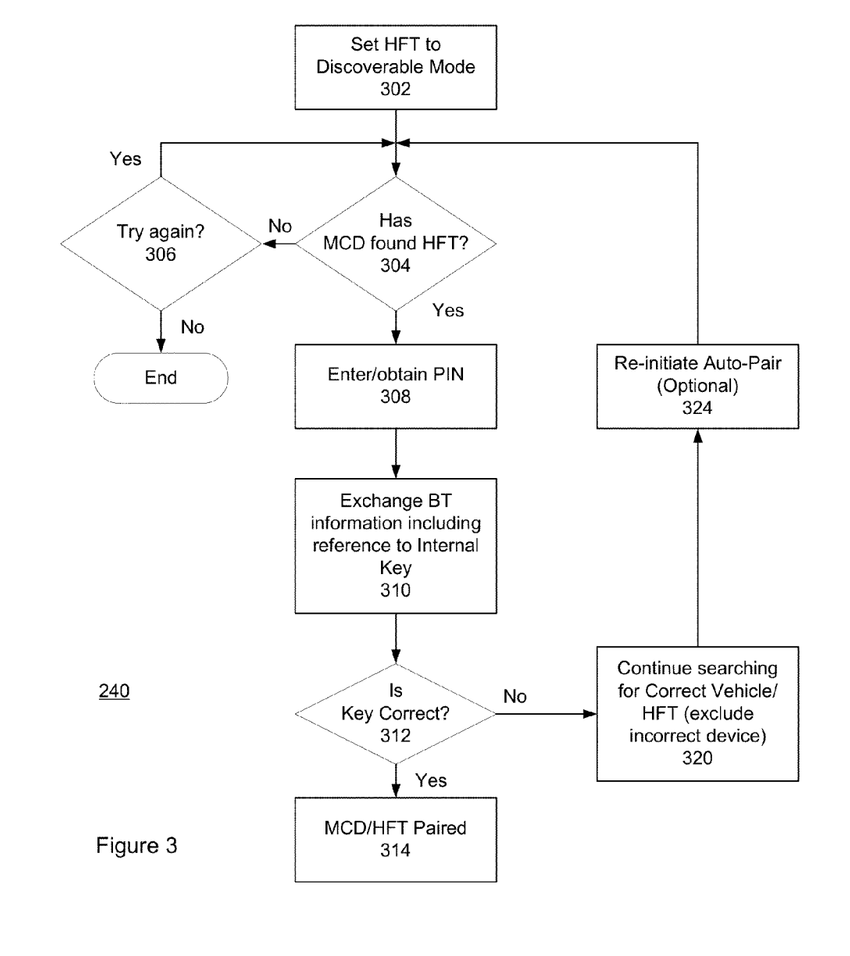
FIG. 3 is a flowchart of a method in accordance with one embodiment of the auto-pairing of the mobile communications device and hands free telephone.

FIG. 3 is a flowchart of a method in accordance with one embodiment of the auto-pairing of the mobile communications device and hands free telephone module 112 of the vehicle. In an embodiment the automatic pairing includes setting 302 the vehicle's hands free telephone (HFT) 112 module to a discovery mode. This can be accomplished by having the vehicle automatically, without user intervention, transition to discovery mode after the occurrence of a triggering event (such as those described above), having the user set the HFT module 112 to discovery mode, which can include having instructions displayed on the MCD 102 via the Honda application, using voice instructions from the vehicle, or having the Honda application in the MCD 102 instruct the HFT 112 to turn on the HFT's 112 discovery mode, for example. The MCD 102 and/or the HFT 112 determines whether the other has been discovered using the short range communication technology, e.g., using conventional Bluetooth® identification protocols, e.g., Bluetooth® specification v2.0 and higher (e.g., versions 3.0+HS, or v4.0 which are both incorporated by reference herein in their entirety). If the MCD 102 and HFT 112 do not find each other then the process can continue looking 306, for example, for a predetermined period of time and/or at certain intervals. Alternatively, the automatic pairing process can end.

If the MCD 102 and HFT 112 find/discover each other, then some pairing processes (such as a Bluetooth® protocol) utilize a shared key (or link key) that is stored in both the MCD 102 and the HFT 112. If both have the same shared key then they may be paired and transmissions between the MCD 102 and HFT 112 can be understood and can encrypted to provide security. In some embodiments a PIN is used that is the same in the MCD 102 and the HFT. Some devices can have a hardcoded PIN, e.g., 1234. In embodiments, the PIN can be automatically entered into the other device, that is, without requiring the user to enter the PIN. In various embodiments the vehicle can have a set PIN that is preprogrammed, and the Honda application automatically identifies the PIN, e.g., by downloading the PIN from a remote server 122 or by having the Honda application determine the PIN based upon the vehicle make, model or other identifier. In another embodiment the MCD 102 receives the PIN by using a near field communication signal, RFID tag or similar technology. In this embodiment, the MCD 102 is positioned near the vehicle and a transfer of the PIN is initiated. The transfer can be automatic based on the MCD 102 being located in close proximity to the transmitter, for example a near field communication or RFID transmitter, or it can be automatically transferred based upon a user selecting a button on the MCD 102 using the Honda application. In these embodiments, where a near field communication or RFID tag is utilized, for example, the PIN can, but need not, be generated at or near the time of the request by the MCD 102 or the HFT 112 and then transmitted to the other.

In alternate embodiments, the MCD 102 can be have the a PIN and the HFT 112 can receive the PIN using a near field communication signal, RFID tag or similar technology. In another embodiment, the PIN can be transferred by having the MCD 102 read a barcode, VIN or other vehicle identification code using, for example, a camera on the MCD 112. The information received in this manner can be the PIN itself or can be a number that is automatically associated with the PIN by the Honda application or the remote server 122, for example.

In alternate embodiments the user can enter the PIN into the MCD 102 or the HFT 112. The PIN can be randomly generated at the time and displayed at the device that generates the PIN, the MCD 102 or in a display in the vehicle that receives the PIN from the HFT 112. Alternatively, the PIN can be set and included in a user's manual, or be set during the manufacture of the MCD 102 or the HFT 112 and displayed to the user for entry into the other device (MCD 102 or HFT 112).

Once the PIN is obtained 308, the MCD 102 and HFT 112 determine the shared key and then information, e.g., based upon a Bluetooth® protocol, is exchanged 310. As described above, the MCD 102 and HFT 112 use the PIN to generate an identical shared key 312 which pairs 314 the devices and enables the devices to be authenticated and can also allow communication between the paired devices to be encrypted. If the keys are not identical 312 because of an error or because the exchanged information is with another device that is not paired, then the process continues searching 320 for the correct HFT 112 and can exclude the incorrect device. The process can then continue with step 304 or a user may be asked to re-initiate 324 the auto-pair process.

Figure 4:
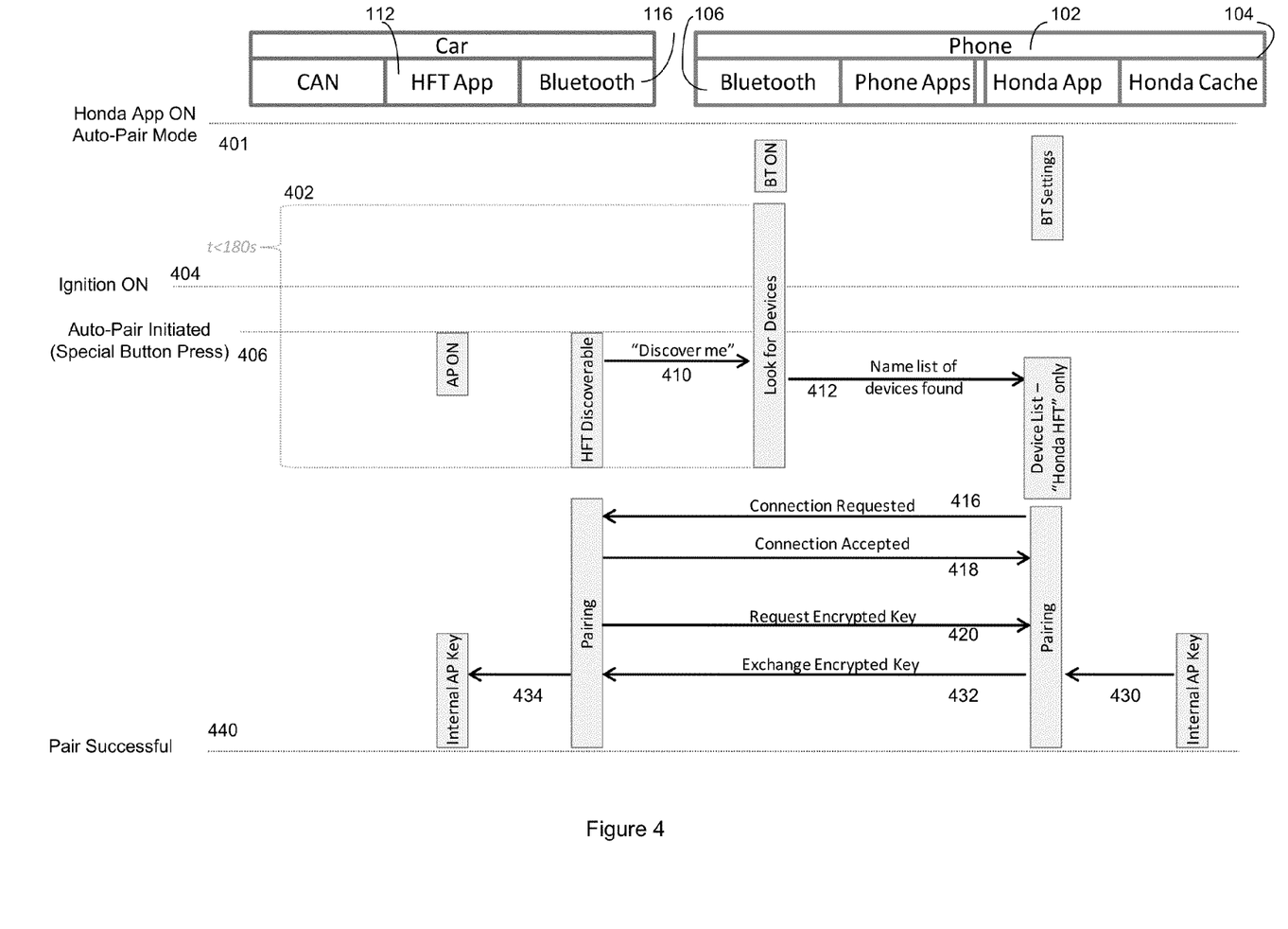
FIG. 4 is a timing diagram of an embodiment in the HFT discovery mode.

FIG. 4 is a timing diagram of an embodiment in the HFT discovery mode. The vehicle includes a communications unit 116, e.g., a Bluetooth® device (used interchangeably hereafter for ease of discussion), the HFT 112 and a controller area network (CAN) that is an internal communication bus within the vehicle. The MCD 102 (phone) includes a communications unit 106, e.g., a Bluetooth® device, along with a Honda Application, other phone applications and cache memory. Some or all of these can be stored in the MCD memory module 104. FIG. 4 is an example of when the HFT is in discovery mode. At time 401 the Honda application initiates 230 the automatic pairing. The Honda application automatically turns on the MCD's 102 Bluetooth® 206 and puts the MCD 102 into discovery mode 210, if necessary. At time 402 the MCD 102 begins to look for devices with which it can pair. At time 404 a trigger event or events occur, e.g., the vehicle's ignition is turned on. At time 406 the automatic pairing process is initiated 230, which, as described above, can be accomplished by having the user press one or more buttons in the vehicle (as in this example) or in the MCD 102. The vehicle goes into automatic pair mode and the HFT enters a discoverable mode and transmits a "discover me" signal that includes, among other information, an identifier, e.g., name or identifier, of the vehicle. The communication unit 106, e.g., a Bluetooth® device, in the MCD 102 receives this signal and the name or identifier of the vehicle is sent to the Honda application at time 412. In alternate embodiments the steps set forth in FIG. 4 can occur in a different order, e.g., step 406 can occur before step 404. In other embodiments not all of the steps set forth in FIG. 4 need to occur, e.g., step 404 does not need to occur before pairing begins in some embodiments.

The Honda application then initiates the pairing between the Bluetooth® device and the vehicle. At time 416 the Honda application sends, via the Bluetooth® device 106 a connection request to the Bluetooth® device 116 in the vehicle. At time 418 the vehicle's Bluetooth® device 116 transmits a connection accepted signal. At time 420 the Honda application transmits a request for an encrypted key which is determined using the MCD's internal key or shared key and sent at time 430. The encrypted key is exchanged with the Vehicle's Bluetooth® device 116 at time 432 and is confirmed by the HFT 112 using the HFT's 112 internal key (shared key) at time 434. If the encrypted key is verified the vehicle transmits a "Pair Successful" signal to the MCD 102 at time 440 indicating that the MCD 102 and the HFT 112 have been successfully paired. FIG. 4 is illustrative of one possible protocol for pairing. It is envisioned that other pairing protocols can be used without departing from the scope of the embodiments.

Figure 5:
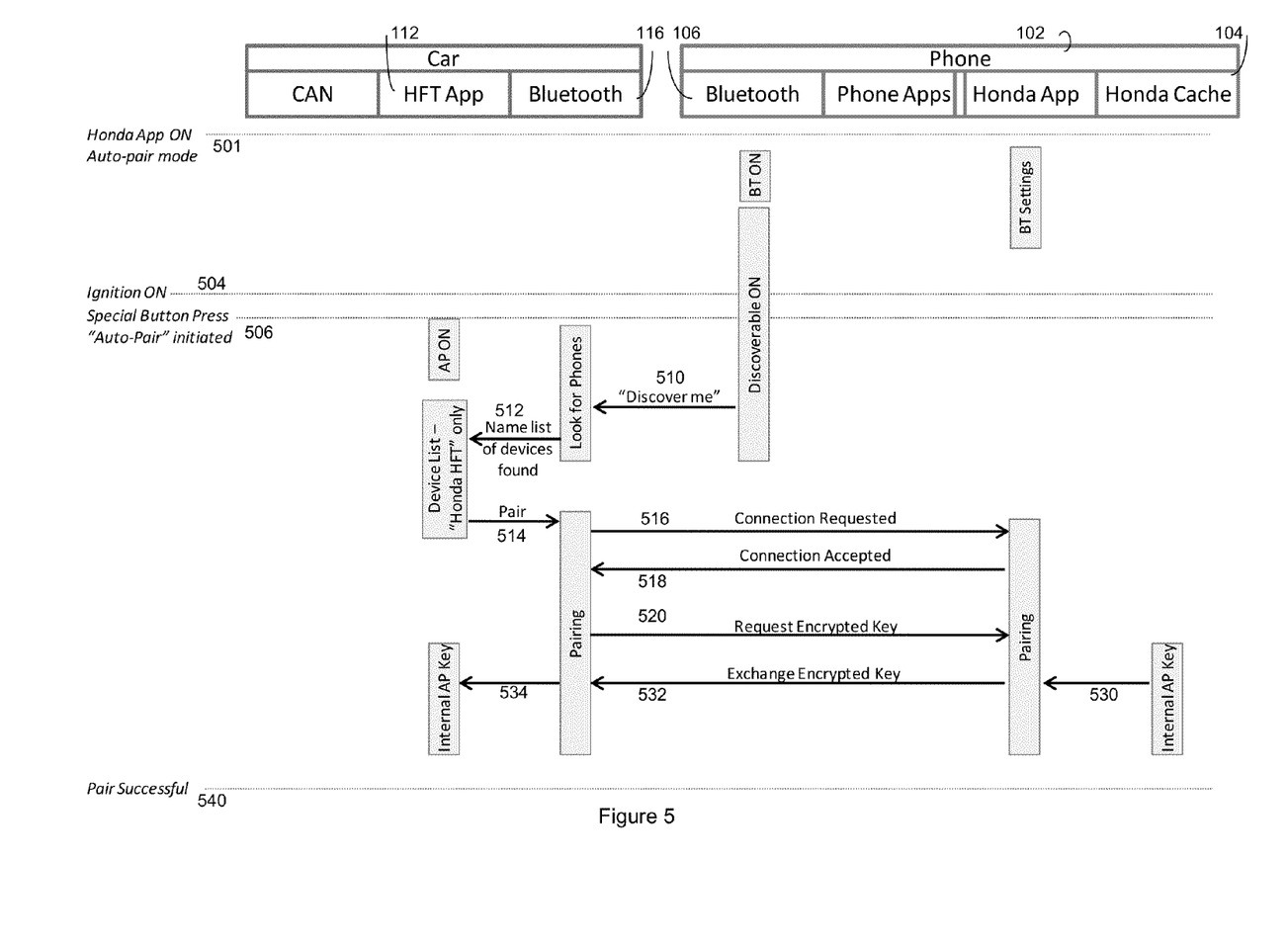
FIG. 5 is a timing diagram of an embodiment in the mobile communications device discovery mode.

FIG. 5 is a timing diagram of an embodiment in the mobile communications device (MCD) 112 discovery mode. As described above, the vehicle includes a communications unit 116, e.g., a Bluetooth® device, the HFT 112 and a CAN. The MCD 102 includes a communications unit 106, e.g., a Bluetooth® device, along with a Honda Application, other phone applications and cache memory. Some or all of these can be stored in the MCD memory module 104. FIG. 5 is an example of when the MCD 102 is in discovery mode, as described above. At time 501 the Honda application initiates 230 the automatic pairing. The Honda application automatically turns 206 on the MCD's communication unit 106, e.g., a Bluetooth® device, if necessary and puts the MCD 102 into discovery mode 210, if necessary. The MCD 102 transmits a Discovery ("Discover Me") signal. At time 504 a trigger event or events occur, e.g., the vehicle's ignition is turned on. At time 506 the automatic pairing is initiated 230, which, as described above, can be accomplished by having the user press one or more buttons in the vehicle (as in this example) or in the MCD 102. The vehicle goes into automatic pair mode and the HFT looks for devices (MCDs for example). The MCD 112 transmits 510 the "Discovery Me" signal that includes, among other information, an identifier, e.g., name or identifier of the MCD 112. In alternate embodiments the steps set forth in FIG. 5 can occur in a different order, e.g., step 506 can occur before step 504. In other embodiments not all of the steps set forth in FIG. 4 need to occur, e.g., step 504 does not need to occur before pairing begins in some embodiments.

The Bluetooth® device 116 in the HFT 112 receives this signal and the name or identifier of the vehicle is sent 512 to a software module in the HFT 112 that controls the pairing process and is capable of pairing using one or more communication protocols. The HFT 112 sends a Pair request signal 514 to the Bluetooth® device 116. The Bluetooth® device 116 in conjunction with the HFT 112 initiates the pairing between the Bluetooth® device and the vehicle. At time 516 the vehicle's Bluetooth® unit 116 sends a connection request to the Honda application in the MCD 102. At time 518 the Honda application in the MCD 102 transmits a connection accepted signal to the HFT's Bluetooth® device 116. At time 520 the Honda application transmits a request for an encrypted key. The MCD 112 determines the encrypted key using the MCD's internal key or shared key and sends it at time 530. The encrypted key is exchanged with the Vehicle's Bluetooth® device 116 at time 532 and is confirmed by the HFT 112 using the HFT's 112 internal key (shared key) at time 535. If the encrypted key is verified the vehicle transmits a "Pair Successful" signal to the MCD 102 indicating that the MCD 102 and the HFT 112 have been successfully paired at time 540. FIG. 5 is illustrative of one possible protocol for pairing. It is envisioned that other pairing protocols can be used without departing from the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A method for pairing a mobile communication device to a vehicle comprising the steps of:
   opening a first application of the mobile communication device, the mobile communication device in an initially unpaired state with respect to the vehicle;
   determining whether a short-range communication capability of the mobile communication device is inactive;
   activating said short-range communication capability of the mobile device without user intervention in response to a determination that said short-range communication capability of the mobile device is inactive;
   determining whether the mobile communication device is in a discovery mode; and
   initiating said discovery mode in the mobile communication device without user intervention in response to a determination that the mobile communication device is not in discovery mode;
   receiving, while in the discovery mode, a first code without manual entry by the user, the first code unknown to the mobile communication device prior to initiating the discovery mode;
   automatically initiating a transfer of an encrypted key between the mobile communication device and the vehicle, the encrypted key based on the first code; and
   automatically pairing said mobile communication device and said vehicle based on the encrypted key using a short-range communication protocol.

2. The method of claim 1, wherein said short-range communication protocol is a Bluetooth protocol.

3. The method of claim 1, wherein said mobile communication device receives said first code by at least one of scanning and interpreting a barcode on the vehicle, scanning and interpreting a number on the vehicle, receiving a near-field communication signal from the vehicle, or receiving an RFID tag signal from the vehicle.

4. The method of claim 1, wherein said step of receiving said first code comprises the steps of:
   identifying at least one of a make, model, or identifier of the vehicle; and
   identifying a corresponding first code for said identified make, model or identifier of the vehicle.

5. The method of claim 4, wherein said step of identifying a corresponding first code comprises:
   searching, using the first application, a database on a remote server, the database correlating correlates codes to the vehicle make, model or identifier.

6. The method of claim 1, wherein said pairing step initiates after the occurrence of a triggering event which can be a single event or a plurality of events.

7. The method of claim 1, further comprising displaying the first code using a display of the mobile communication device after receiving the first code.

8. A non-transitory computer readable medium having computer executable code for pairing a mobile communication device to a vehicle comprising, the computer executable code when executed by a processor causing the processor to perform steps including:
   opening a first application of the mobile communication device, the mobile communication device in an initially unpaired state with respect to the vehicle; determining whether a short-range communication capability of the mobile communication device is inactive;
   activating said short-range communication capability of the mobile device without user intervention in response to a determination that said short-range communication capability of the mobile device is inactive;

determining whether the mobile communication device is in a discovery mode; and initiating said discovery mode in the mobile communication device without user intervention in response to a determination that the mobile communication device is not in discovery mode;

receiving, while in the discovery mode, a first code without manual entry by the user, the first code unknown to the mobile communication device prior to initiating the discovery mode;

automatically initiating a transfer of an encrypted key between the mobile communication device and the vehicle, the encrypted key based on the first code; and automatically pairing said mobile communication device and said vehicle based on the encrypted key using a short-range communication protocol.

9. The non-transitory computer readable medium of claim 8, wherein said short-range communication protocol is a Bluetooth protocol.

10. The non-transitory computer readable medium of claim 8, wherein said mobile communication device receives said first code by at least one of scanning and interpreting a barcode on the vehicle, scanning and interpreting a number on the vehicle, receiving a near-field communication signal from the vehicle, or receiving an RFID tag signal from the vehicle.

11. The non-transitory computer readable medium of claim 8, wherein said step of receiving said first code comprises the steps of:

identifying at least one of a make, model, or identifier of the vehicle; and identifying a corresponding first code for said identified make, model or identifier of the vehicle.

12. The non-transitory computer readable medium of claim 11, wherein said step of identifying a corresponding first code comprises:

searching, using the first application, a database on a remote server, the database correlating correlates codes to the vehicle make, model or identifier.

13. The non-transitory computer readable medium of claim 8, wherein said pairing step initiates after the occurrence of a triggering event which can be a single event or a plurality of events.

14. The non-transitory computer-readable storage medium of claim 8, further comprising displaying the first code using a display of the mobile communication device after receiving the first code.

15. A method for pairing a mobile communication device to a vehicle comprising the steps of:

configuring an in-vehicle computing system to enter a discovery mode responsive to a triggering event;

while in the discovery mode, automatically obtaining a first code associated with the mobile communication device without manual entry by the user, the first code previously unknown to the in-vehicle system prior to entering the discovery mode;

automatically initiating a transfer of an encrypted key between the in-vehicle computing system and the mobile communication device, the encrypted key based on the first code; and automatically pairing the mobile communication device and the in-vehicle computing system based on the encrypted key using a short-range communication protocol.

16. The method of claim 15, wherein said in-vehicle system receives said first code by at least one of receiving a near-field communication signal from the mobile communication device or receiving an RFID tag signal from the mobile communication device.

17. The method of claim 15, wherein configuring the in-vehicle computing system to enter the discovery mode responsive to the triggering event comprises:

detecting a button press by a user associated with a user interface of the in-vehicle computing system.

18. The method of claim 15, wherein configuring the in-vehicle computing system to enter the discovery mode responsive to the triggering event comprises detecting an opening of a door of the vehicle.

19. The method of claim 15, wherein configuring the in-vehicle computing system to enter the discovery mode responsive to the triggering event comprises detecting a vehicle ignition turning on.

20. The method of claim 15, wherein configuring the in-vehicle computing system to enter the discovery mode responsive to the triggering event comprises:

detecting a location of the vehicle using a global positioning system; and detecting the location matches a predetermined location.

21. The method of claim 15, further comprising displaying the first code using a display of the in-vehicle system after receiving the first code.

* * * * *